United States Patent
Maufer et al.

(10) Patent No.: US 7,191,331 B2
(45) Date of Patent: Mar. 13, 2007

(54) DETECTION OF SUPPORT FOR SECURITY PROTOCOL AND ADDRESS TRANSLATION INTEGRATION

(75) Inventors: Thomas Albert Maufer, Cupertino, CA (US); Sameer Nanda, San Jose, CA (US); Paul J. Sidenblad, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 831 days.

(21) Appl. No.: 10/172,345

(22) Filed: Jun. 13, 2002

(65) Prior Publication Data

US 2003/0233576 A1 Dec. 18, 2003

(51) Int. Cl.
*H04L 9/00* (2006.01)

(52) U.S. Cl. .................. 713/153; 713/154
(58) Field of Classification Search .......... 713/201, 713/153, 154; 726/11
See application file for complete search history.

(56) References Cited

U.S. PATENT DOCUMENTS

| | | | | |
|---|---|---|---|---|
| 5,732,071 A * | 3/1998 | Saito et al. | ................ | 370/255 |
| 5,757,924 A * | 5/1998 | Friedman et al. | ........... | 713/151 |
| 5,793,763 A * | 8/1998 | Mayes et al. | ............... | 370/389 |
| 6,047,325 A * | 4/2000 | Jain et al. | ................... | 709/227 |
| 6,061,356 A * | 5/2000 | Terry | ........................... | 370/401 |
| 6,079,020 A * | 6/2000 | Liu | .............................. | 726/15 |
| 6,226,751 B1 * | 5/2001 | Arrow et al. | ................. | 726/15 |
| 6,330,562 B1 * | 12/2001 | Boden et al. | ................. | 707/10 |
| 6,353,614 B1 * | 3/2002 | Borella et al. | .............. | 370/389 |
| 6,493,349 B1 * | 12/2002 | Casey | ........................ | 370/409 |
| 6,542,935 B1 * | 4/2003 | Ishii | ........................... | 709/245 |
| 6,615,357 B1 * | 9/2003 | Boden et al. | ................. | 726/15 |
| 6,886,103 B1 * | 4/2005 | Brustoloni et al. | ........... | 726/15 |
| 6,957,346 B1 * | 10/2005 | Kivinen et al. | ............. | 713/153 |
| 2002/0046348 A1 * | 4/2002 | Brustoloni | ................... | 713/201 |
| 2002/0048348 A1 | 4/2002 | Brustoloni | | |
| 2002/0136210 A1 * | 9/2002 | Boden et al. | ............... | 370/389 |
| 2002/0150114 A1 * | 10/2002 | Sainomoto et al. | ........ | 370/402 |
| 2002/0162026 A1 * | 10/2002 | Neuman et al. | ............ | 713/201 |
| 2003/0007486 A1 * | 1/2003 | March et al. | ................ | 370/389 |
| 2003/0048780 A1 * | 3/2003 | Phomsopha | .................. | 370/389 |
| 2003/0048804 A1 * | 3/2003 | Inouchi et al. | ............. | 370/466 |
| 2003/0145104 A1 * | 7/2003 | Boden et al. | ............... | 709/238 |
| 2003/0233568 A1 | 12/2003 | Maufer et al. | | |

FOREIGN PATENT DOCUMENTS

| | | |
|---|---|---|
| EP | 1 130 846 A2 | 9/2001 |
| WO | WO 99/35799 | 7/1999 |
| WO | WO 00/56034 | 9/2000 |
| WO | WO 01/67258 A1 | 9/2001 |
| WO | WO 01/76191 A1 | 10/2001 |

* cited by examiner

Primary Examiner—Emmanuel L. Moise
Assistant Examiner—Techane J. Gergiso
(74) Attorney, Agent, or Firm—Patterson & Sheridan, L.L.P.

(57) ABSTRACT

Method and apparatus for integration of network address translation and source address security, including, but not limited to, determining whether a gateway computer is integrated for network address translation and source address security, is described. A client computer requests a first address from the gateway computer and then requests a second address from the gateway computer. The latter request is done with a different client identifier that is nearly equivalent, except for one bit, to the client identifier used for the prior address request. If the gateway computer is integrated for network address translation and source address security, in response to the latter request a public address will be provided from the gateway computer to the client computer.

15 Claims, 6 Drawing Sheets

| Time Stamp 305 | Local Client MAC Address 301 | Local Client Pub. IP Address 309 | Local Client Priv. IP Address 306 | Remote-to-Local-SPI 302 | IPSec Prot. 308 | Pend. Bit 303 | Remote IP Address 304 | ISAKMP Initiator Cookie 307 |
|---|---|---|---|---|---|---|---|---|
| 10:15:00 | 0x00-04-4B-48-02-84 | 64.173.243.14 | | 0x9C12D494 | ESP | 0 | 207.163.162.97 | 64 bits of binary data |
| 12:59:00 | 0x00-04-4B-47-05-27 | 64.173.243.16 | | 0xE1766D01 | AH | 0 | 199.13.62.17 | 64 bits of binary data |
| 14:40:00 | 0x00-04-4B-47-59-24 | 64.173.243.12 | | 0x3B98F029 | ESP-with-AH | 0 | 201.13.87.191 | 64 bits of binary data |

FIG. 5A

| Time Stamp 305 | Local Client MAC Address 301 | Local Client Pub. IP Address 309 | Local Client Priv. IP Address 306 | Remote-to-Local-SPI 302 | IPSec Prot. 308 | Pend. Bit 303 | Remote IP Address 304 | ISAKMP Initiator Cookie 307 |
|---|---|---|---|---|---|---|---|---|
| 10:15:00 | 0x00-04-4B-48-02-84 | 64.173.243.14 | | 0x9C12D494 | ESP | 0 | 207.163.162.97 | 64 bits of binary data |
| 12:59:00 | 0x00-04-4B-47-05-27 | 64.173.243.16 | | 0xE1766D01 | AH | 0 | 199.13.62.17 | 64 bits of binary data |
| 14:40:00 | 0x00-04-4B-47-59-24 | 64.173.243.12 | | 0x3B98F029 | ESP-with-AH | 0 | 201.13.87.191 | 64 bits of binary data |
| 11:01:37 | | | 10.0.0.17 | ? | ? | 1 | 66.172.13.88 | 64 bits of binary data |

FIG. 5B

DETECTION OF SUPPORT FOR SECURITY PROTOCOL AND ADDRESS TRANSLATION INTEGRATION

FIELD OF THE INVENTION

The present invention relates generally to enhanced security for communication over a network, and more particularly to integration of Internet Protocol Security (IPSec) and Network Address Translation (NAT).

BACKGROUND OF THE INVENTION

The Internet remains a growing public network. Many companies rely on communication over the Internet to facilitate their business endeavors. However, public access also comes along with security risks. To enhance security on the Internet, the Internet Engineering Task Force (IETF) designed a set of protocols known collectively as Internet Protocol Security ("IPSec"). IPSec is designed to provide authentication and encryption for communication over networks, such as the Internet. Network Address Translation (NAT) has also been a large factor in the growth of the Internet, but unfortunately the operation of NAT is at odds with IPSec.

NAT translates between a set of one or more private IP (Internet Protocol) addresses used for local internal network traffic with one or more "public" IP addresses to be chosen dynamically when internal addresses wish to exchange traffic with external machines. A translation table in a NAT gateway allows an organization's Internet traffic to share one (or more) public address(es) that have been assigned to the organization. Outbound packets for new connections cause new NAT translation table entries to be created in the gateway. The NAT translation table is used to perform inverse translation on traffic arriving in the opposite direction (i.e., incoming traffic—from the public Internet).

A client computer on a LAN may have a local IP address that has been assigned statically; however, conventionally, a Dynamic Host Configuration Protocol (DHCP) server entity dynamically assigns a private IP address to a client computer on a LAN. Such a private address is uniquely chosen from a pool of available private IP addresses. The DHCP server process is frequently co-located in the NAT gateway, but it could be hosted in a separate device within the private network. So, for example, an IP packet from a client computer, or other local machine, which is part of a local or private domain ("behind") with respect to a NAT gateway, comprises IP Source and Destination addresses in the packet's IP header, and comprises Source and Destination Port addresses in the packet's User Datagram Protocol or Transmission Control Protocol (UDP or TCP) header. Conventionally, the packet's IP Source Address field will contain the private IP address that was statically or dynamically assigned to the client computer, while the packet's IP Destination Address field will contain a private IP address, for a packet destined for another machine behind the NAT gateway, or a public IP address, for a packet destined for another machine not behind the NAT gateway, such as remote computer connected to the Internet.

For the latter example, a NAT gateway changes an outbound packet's IP Source Address field from a locally unique private IP address to a public, or globally unique, IP address. The packet's new Source Address, now a public IP Source Address, is conventionally either the IP address of the NAT gateway's external interface or allocated from a pool of available public addresses managed by the NAT gateway.

Furthermore, a NAT gateway may need to translate transport-layer addresses (i.e., TCP or UDP ports) to allow more connections to share the same IP address. In instances where the NAT gateway is using its own public IP address as a public IP address for outbound packets from local machines, external connections will appear to emanate from the NAT gateway computer. In order to prevent two local client machines from communicating with the same Remote IP Address and selecting the same Destination TCP or UDP Port, which would make it impossible for the NAT gateway to determine which client should get return traffic, each connection at the NAT gateway computer is translated so that outbound traffic appears to emanate from a uniquely identifiable IP public address, and TCP or UDP Source Port pair. The chance of such a situation occurring may sound remote, but it is possible, especially as the number of local clients increases, and it is a situation that may be avoided by performing TCP or UDP port translation in addition to IP address translation. Because a NAT gateway stores not only private/public IP address associations but also TCP or UDP port associations for translation and forwarding of incoming traffic, NAT is sometimes referred to as Network Address and Port Translation (NAPT).

IPSec depends in part on a negotiation of parameters governing a connection that requires enhanced security. The collection of parameters, including such exemplary items as authentication and/or encryption session keys, key lifetimes, encryption or authentication algorithms, among other known items, that govern negotiated security parameters between peer stations are known collectively as a Security Association (SA). An SA negotiation is done in accordance with a protocol known as the Internet Security Association and Key Management Protocol (ISAKMP) using the Oakley key determination algorithm. ISAKMP/Oakley is more commonly known as Internet Key Exchange (IKE). One result of an IKE negotiation is a private agreement on randomly chosen session keys to be used for encrypting and decrypting, and/or for digitally signing messages (i.e., IP packets). UDP port 500 is reserved for ISAKMP, IPSec's control protocol.

IPSec-protected IP packets will incorporate at least one of two types of IPSec security protocol headers, according to whether authentication, encryption, or both, has been negotiated in an IKE. To summarize these IPSec security protocol headers for purposes of clarity: an "Authentication Header" (AH) is used when authentication has been negotiated, an "Encapsulating Security Payload" (ESP) header is used when encryption has been negotiated, and an AH encapsulating an ESP header is used when an IP packet contains both AH and ESP headers such as when ESP with AH has been negotiated.

Once an IPSec Security Association has been established, an Internet Protocol header of each IPSec-protected packet specifies the type of security protocol in use, i.e., AH or ESP, including a combination thereof. In IP version 4 ("IPv4"), there is an 8-bit "Protocol" field in an IPv4 header, which indicates the next higher-layer protocol that is logically above the IP layer. In IP version 6 ("IPv6), there is an 8-bit "Next Header" field that provides similar functionality to the Protocol field in an IPv4 header. In both IPv4 and IPv6, a value of 0×32 means ESP, and 0×33 means AH. The AH and ESP headers both contain a 32-bit field for a numerical value known as a Security Parameters Index (SPI).

If an IP packet has been digitally signed (using AH), certain important parts of the IP header of such an IP packet may not be modified, else an IPSec peer station receiving such an IP packet will not be able to verify that the IP packet's digital signature is correct. But, in the course of a conventional operation, a NAT gateway will change the packet's IP Source Address for outbound (i.e., local-to-remote, or private-to-public) packets, or the packet's destination address for inbound (i.e., Remote-to-Local, or public-to-private) packets. In either direction, NAT transformation of the IP header will impede the IPSec peer station's ability to verify the AH digital signature. For an outbound traffic example, when an intervening NAT gateway or router changes a packet's private IP Source Address to a global, or public, IP address, authentication at a receiving computer will fail since the private IP address is no longer available to the receiver in its verification of the digital signature. Heretofore, IPSec AH was incompatible with NAT owing to necessary changes made to an IP packet during transit through a NAT gateway.

For encrypted but not signed packets (i.e., those IPSec packets that are protected by ESP without AH), transport layer headers are not decipherable to third parties (nor are they at their usual locations in the packet, even if they were decipherable), including a NAT gateway, and thus TCP or UDP port numbers are not available for a NAT gateway to use in the process of outbound and/or inbound translation. Thus, even IPSec ESP alone (i.e., ESP without AH) interferes with basic NAT operation, regardless of the presence of an Authentication Header. By extension, for an IP packet that is protected by both AH and ESP, it's source IP address may not be changed and port numbers are encrypted.

In summary, an AH header, an ESP header, or both may be added to an IP packet. Importantly for NAT, the IP Source Address field of AH-protected packets cannot be changed, because it is part of the input to the digital signature algorithm. Importantly for ESP-protected packets, the IP Source Address may be changed without interfering with the ability of peer stations to decrypt received packets, though Source and Destination Port numbers are encrypted and thus not decipherable to by a NAT gateway. So in the context of ESP, heretofore there was no mechanism to clarify return traffic routing, namely, to determine which private station should receive an ESP-protected packet, as TCP or UDP port numbers are not decipherable by the NAT gateway. Moreover, ESP-protected traffic for a Virtual Private Network (VPN) heretofore limited the number of VPN sessions to a same Remote IP Address or involved non-standard modifications to a VPN client.

Accordingly, it would be desirable and useful to provide an integration of NAT and IPSec that does not add significant overhead and does not require an IP Source or Destination Address and/or TCP or UDP Source or Destination Port translation that is incompatible with IPSec's security algorithms.

SUMMARY OF THE INVENTION

An aspect of the present invention is a method for probing a gateway computer by a client computer to determine if network address translation is integrated with source address security. A first request for a first address is made of the gateway computer by the client computer with a first client identifier. The first address is sent by the gateway computer in response to the first request. A second request is made for a second address from the gateway computer by the client computer with a second client identifier, where the second client identifier is similar to the first client identifier. The second address is received by the client computer from the gateway computer in response to the second request. The client computer determines from the second address requested whether the network address translation is integrated with the source address security for the gateway computer.

Another aspect of the present invention is a method for network address translation for source address protected packets. A client computer is provided in communication with an address server computer. A first request from the client computer is made for a first address from the address server computer, where the client computer is identifiable by the address server computer by a medium access control number. A private address is provided by the address server computer to the client computer in response to the first request. An alteration of the medium access control number is generated by the client computer to provide an altered medium access control number. A second address from the address server is requested by the client computer, where the client computer is identifiable by the address server computer by the altered medium access control number. The address server computer associates the client computer with the first request and the second request by relating the medium access control number with the altered medium access control number; and provides to the client computer a public address in response to the second request.

BRIEF DESCRIPTION OF THE DRAWINGS

So that the manner in which the above cited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIGS. 5A and 5B are table diagrams of exemplary embodiments of IPSec Association Mapping Tables (IP-SAMTs) in accordance with one or more aspects of the present invention.

DETAILED DESCRIPTION

Figure 1:
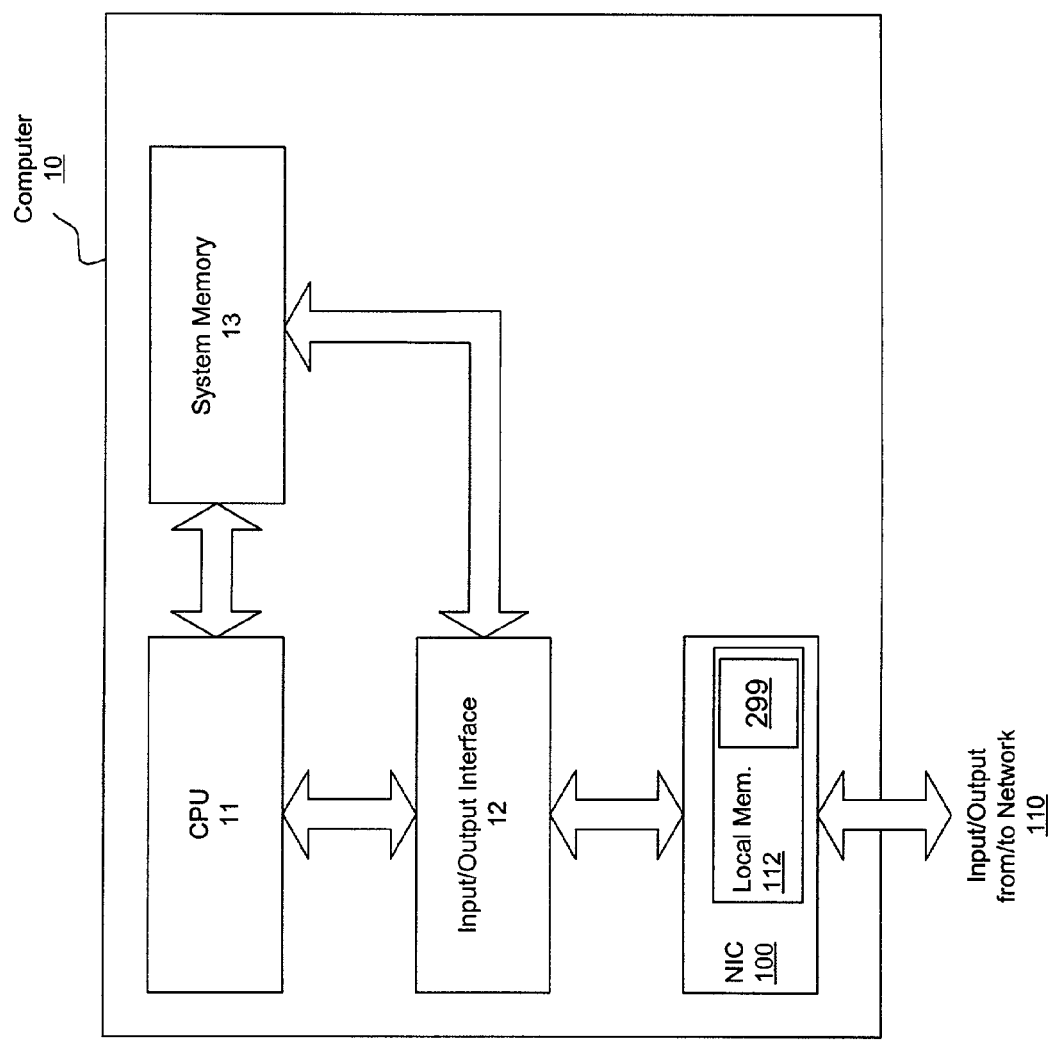
FIG. 1 is a block diagram of an exemplary embodiment of a computer system in accordance with one or more aspects of the present invention.

The present invention provides method and apparatus for the coexistence of IPSec and NAT, whereby a mechanism is created in which no IPSec-incompatible NAT IP address or TCP or UDP port translation needs to be done to a packet, as a client computer's externally destined packets are constructed so that they do not use a private IP Source Address. Instead, the client's IPSec software creates its externally destined packets using a public IP address provided by a NAT device.

Traffic from each Remote IP Address to each local peer client machine will have a unique Security Parameters Index in an AH or ESP header, which may be used instead of the TCP or UDP ports in allowing a NAT gateway to decide to which local station to send an IPSec-protected packet. As long as each local client is talking to one Remote IP Address, and no other client is talking to that same Remote IP Address, translation may be a conventional NAT translation, involving only the IP Source Address field. However, if multiple local client machines are directed to communicate with the same Remote IP Address, then an IPSec-capable NAT gateway may need to perform IKE suppression in order to make sure that only one SA is being negotiated at a time between any local/remote pair of machines. A subtlety here lies in the fact that a Security Parameters Index, while used in the clear, is negotiated in private, so a NAT gateway does not have access to a negotiated Security Parameters Index that is in use until a remote station sends the first IPSec-protected packet to a local station. Once that Security Parameters Index is known, other local stations may, one at a time, negotiate their own Security Associations with that remote station.

An aspect of the present invention is a method for allowing use of IPSec's AH in situations wherein a NAT gateway is situated between a client computer and a remote computer. The client computer requests a public address from the gateway computer, and in response the public address is provided to the client computer. An IPSec Security Association is negotiated with a remote computer. The Security Association negotiation is used by the gateway computer as a trigger to record an association between the client's local address (its MAC address in the case of NAT/AH coexistence, its private IP address in the case of NAT/ESP coexistence) with the remote computer's IP address, where the local address and the destination address are obtained from the first outbound security association negotiation packet. A Security Parameters Index value resulting from the security association negotiation with the remote computer is obtained and stored in association with the local address for future use, namely, once the remote station starts sending IPSec-protected traffic toward the local client.

An aspect of the present invention is a data structure for a gateway computer. The data structure comprises a local address (Medium Access Control (MAC) or IP address) field, a Remote IP Address field associated with the aforementioned local address field, and a Remote-to-Local Security Parameters Index (SPI) field associated with the local address field and the remote address field for particularly identifying traffic flowing from the remote address to the local address. The Remote-to-Local SPI field is for storing at least one Security Parameters Index from a remotely located machine.

An aspect of the present invention is a method for Internet Key Exchange (IKE) suppression. A gateway computer is configured with a mapping table. A received packet is checked to determine if it is an IKE packet. If it is an IKE packet, the mapping table is checked to see if the destination (remote) IP address matches an entry in the mapping table that also matches the packet's source MAC or IP address. In addition, the ISAKMP "Initiator Cookie" value (64 bits) is checked for a match with this mapping table entry, the one that matches this pair of addresses, namely, the client's MAC or IP address and the Remote IP Address. In response to finding a matching entry in the mapping table, a check is made for an indication that a security negotiation between the local client and Remote IP Address is in progress or complete. Transmission of the IKE packet is suppressed if there is not yet a Remote-to-Local Security Parameters Index in the mapping table.

An aspect of the present invention is a method for gateway routing. A Remote-to-Local packet is checked for a valid Security Parameters Index for a mapping table entry matching the packet's Remote IP Address (the Remote-to-Local packet's IP Source Address) and its IP Destination Address, which must be the public IP address that the gateway machine allocated to the machine using the local client's MAC address. If a matching Remote-to-Local Security Parameters Index is found that is associated with this Remote IP Address, then the packet is forwarded to the local client, using either its public IP Destination Address and its MAC address, or its private IP address, as indicated by the contents of this row of the mapping table. When the private IP address field is filled in, the contents of the public IP address and MAC address fields will be blank.

An aspect of the present invention is a method for the processing of IPSec AH packets by a NAT gateway computer. The IP Source Address field for a local-to-remote IPSec packet is checked to see whether it contains a private address, or a public address that was assigned to the station possessing the MAC address found in the packet's MAC Source Address field. If the gateway discovers that the packet's IP Source Address is a public address that the gateway also knows that it had assigned to the machine having the same MAC address as the MAC address in the packet's MAC Source Address field, then IPSec packet is transmitted unchanged by the NAT gateway computer (except for decrementing the TTL and updating the IP checksum in the case of IPv4 packets; IPv6 packets are plentiful enough such that NAT is not required, thus there is no IPSec versus. NAT issue for IPv6).

The IP Source Address field for Remote-to-Local IPSec packets is matched against the Remote IP Address column in the mapping table, and the packet's SPI is matched against the expected Remote-to-Local SPI that is stored in a row of the mapping table that is associated with this Remote IP Address. If a matching mapping table entry is found, the packet is forwarded to the local client's MAC address (or private IP address) extracted from the matching row in the mapping table.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Referring to FIG. 1, there is shown a block diagram of an exemplary embodiment of a computer system 10 in accordance with one or more aspects of the present invention. Computer system 10 comprises CPU 11, system memory 13, input/output (I/O) interface 12, and NIC 100. NIC 100 may be coupled for I/O from/to a network 110. NIC 100 comprises local memory 112.

Figure 2:
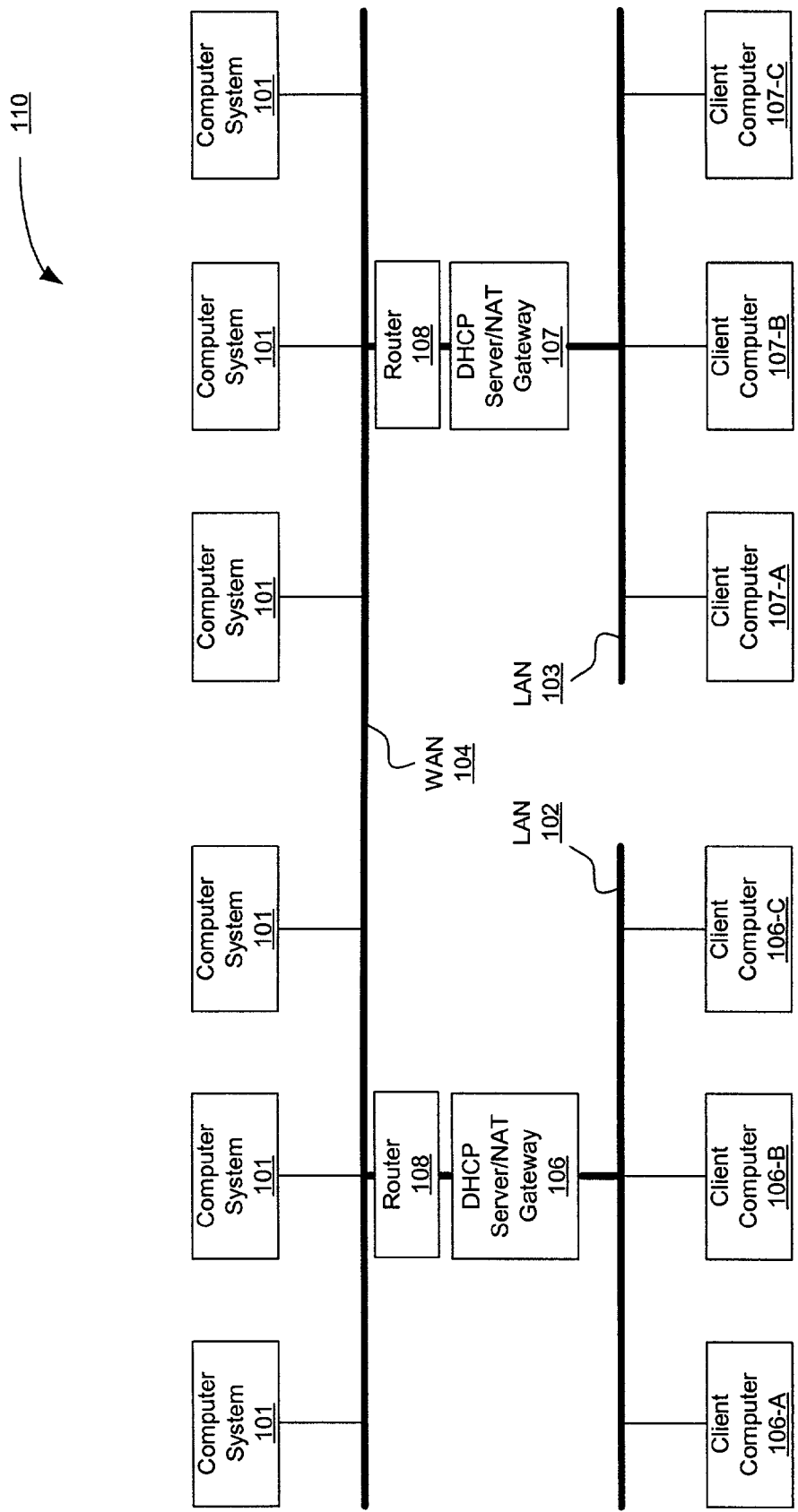
FIG. 2 is a network diagram of an exemplary embodiment of a network in accordance with one or more aspects of the present invention.

Referring to FIG. 2, there is shown a network diagram of an exemplary embodiment of a network 110 in accordance with one or more aspects of the present invention. Network 110 comprises wide area network (WAN) 104. WAN 104 may be the Internet, an Internet subnetwork ("subnet") or other wide area network. One or more computer systems 101 may be logged onto WAN 104 from time-to-time. Notably, one or more of computer systems 101 may be servers. Additionally, DHCP Servers/NAT gateways ("gateways") 106 and 107 are coupled to LANs 102 and 103, respectively.

Client computers 106-A, 106-B and 106-C may be put in communication with gateway 106 via LAN 102. Likewise, client computers 107-A, 107-B and 107-C may be put in communication with gateway 107 via LAN 103. NAT gateways 106 and 107 may be coupled to WAN 104 via routers 108. Alternatively, gateways 106 and 107 may be gateway-routers, namely, a combination of a NAT gateway and a router; even the DHCP Server function may be incorporated in the unified device.

Network 110 is merely an exemplary embodiment, and fewer or more computers, gateways, LANs or WANS, and combinations thereof, may be used. Moreover, client computers 106-A, 106-B and 106-C may be configured like computer system 10 of FIG. 1 in that each has a NIC 100 with local memory 112. For purposes of clarity, though other arrangements may be used as described, the remainder of this description is for a client computer 106-A behind a DHCP/NAT gateway 106 that is coupled to the Internet 104 via a router 108 for communication with a remote server 101. A conventional example of such a network may be workers in a Small Office/Home Office (SOHO) network connecting to a company's server via the Internet. For purposes of clarity, a local address refers to an address assigned by a gateway, and a non-local address refers to all other addresses.

Figure 3:
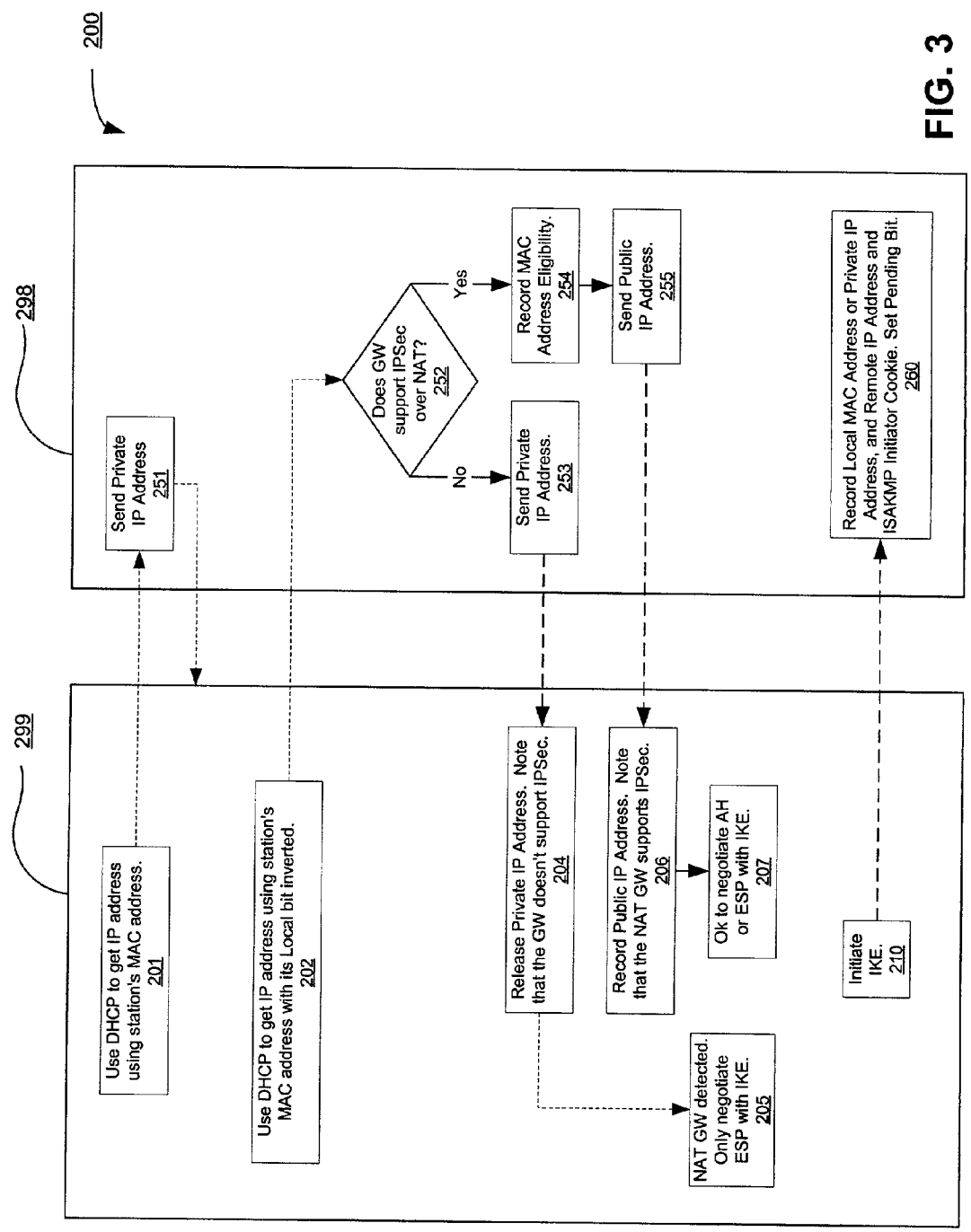
FIGS. 3, 3A and 4 are respective flow diagrams of exemplary embodiments of respective portions of an IPSec/NAT integration process in accordance with one or more aspects of the present invention.

Referring to FIG. 3, there is shown a flow diagram of an exemplary embodiment of a portion of an IPSec/NAT integration process 200 in accordance with one or more aspects of the present invention. Integration process 200 comprises IPSec/NAT client-side integration sub-process 299 and IPSec/NAT gateway-side integration sub-process 298. With reference to FIG. 3 and renewed reference to FIGS. 1 and 2, integration process 200 is described.

At step 201, a client computer, such as client computer (or "client") 106-A, requests an IP address from a gateway, such as gateway 106. Such a request at step 201 may be made by software programmed into client computer 106-A, and more particularly, may be a part of a driver for a network interface, such as a "network interface card" or "NIC" 100, or may be part of hardware or firmware of such a NIC including, but not limited to, program code 299 stored in local memory 112.

If client 106-A receives a private IP address, then client 106-A knows that a NAT gateway is being used as client 106-A is able to send traffic outside a private address domain. As the list of private IP addresses is well known, client 106-A can test to determine if it was assigned a private IP address. In step 202, client 106-A submits another request for an IP address, this time inverting the local bit in its DHCP client identifier (also known as its MAC address). As is well known, each computer on a LAN, including both gateway and clients, is assigned a unique number with respect to such a LAN, namely, a MAC address. A conventional MAC address is a 48 bit number divided into two 24 bit segments known as the Organizationally Unique Identifier (OUI) and the Manufacturer's Unique Identifier. The first byte of an OUI has a least significant bit (LSB) that is a multicast bit. The next-to-least significant bit in the most significant bytes is the Local bit.

For example, a DHCP process on NAT gateway 106 assigns client computer 106-A logged onto a LAN, such as LAN 102, a private IP address at step 251 in response to a first DHCP request with a first client identifier from step 201, then a second DHCP request may be made at step 202 to NAT gateway 106 with a different client identifier from client computer 106-A logged onto LAN 102. It is important that this second client identifier be derived from the associated first client identifier. Thus, if gateway 106 supports IPSec over NAT, as indicated by an implicit check at step 252, it can discern that two MAC addresses are from the same requesting station. A NAT gateway configured to support AH IPSec will make this determination and thus will not send a second private IP address, but will instead send a public IP address at step 255. However, if such a NAT gateway does not support AH IPSec, then a DHCP server will assign a second private IP address at step 253, since it does not attribute any relationship between these two MAC addresses that differ in only their respective Local bit values.

If gateway 106 is configured to do AH IPSec with NAT, at step 254 gateway 106 may record a MAC address for client computer 106-A in a mapping table as being eligible to send gateway 106 packets with a public IP Source Address. Alternatively, gateway 106 may wait for an IKE as described below in more detail.

Based on assignment of a private IP address after step 201, client 106-A already can infer the presence of a NAT gateway 106. Assignment of a second private IP address indicates at step 204 to client 106-A that NAT 106 gateway does not support AH IPSec. However, if client 106-A receives a non-private (i.e., public) IP address in response to a DHCP request from step 202, then client 106-A in response knows at step 206 that NAT gateway 106 supports AH IPSec, and records a public IP address in association with a MAC address at step 206, as described below in more detail. Moreover, if NAT gateway 106 supports AH IPSec, then client 106-A may subsequently negotiate AH and/or ESP using IKE, which capability may be noted or recorded as indicated by step 207. Whereas, client 106-A is limited to negotiate ESP-only with IKE if it has detected that NAT gateway 106 does not support AH IPSec.

A DHCP server in NAT gateway 106 is configured to correlate two MAC addresses as corresponding to the same client computer 106-A when a client identifier that was supplied in an original DHCP request only differs from a subsequent DHCP client identifier in that it has an inverted Local bit. In other words, except for the Local bit each DHCP client identifier is otherwise identical. Such a DHCP server is programmed in response to two MAC addresses stored in a mapping table differing by just the Local bit, to transmit a (one of) public address(es) available to gateway 106 to client computer 106-A, whereby such a public IP address may be used for an AH or ESP-with-AH IPSec session as described below in more detail.

If, however, a DHCP server does not support correlation of two DHCP requests from a same client computer 106-A as described, wherein client identifiers differ only in Local bit value, then a second private IP address will be sent to a requesting client computer 106-A. If a client computer 106-A receives a second private address, it will use DHCP to release one of the private IP addresses at step 204 back into a pool of private addresses so that it can be assigned to another local station. Accordingly, if a second private IP address is sent from a DHCP server, then that informs a client computer 106-A that NAT is being used and that no public IP address assignment capability is provided. Stated another way, gateway 106 supports NAT but it does not support AH IPSec and NAT according to the algorithms defined herein. Thus, at step 205, client computer determines that it can only safely support IKE negotiation of ESP-based security associations, for reasons that are described in more detail below.

Notably, a public IP address is not needed in accordance with one or more aspects of the present invention for ESP-only IPSec. However, conventionally there is no a priori knowledge of whether AH-only, ESP-only, or ESP-with-AH IPSec is going to be used as a result of an IKE negotiation. Accordingly, process 200 requests a public IP address in advance just in case AH-only or ESP-with-AH IPSec may be agreed upon for an IKE. If available, a public IP Source Address is used to flag to gateway 106 that IPSec communication is being done. Gateway 106 also can get a clue that IPSec communication is being done by observing that client 106-A sent a DHCP client identifier with a flipped Local bit to request a public IP address (and that one was assigned by gateway 106), and also based on initiation of an IKE exchange from client 106-A. Moreover, because a public IP Source Address as described herein will work for ESP-only IPSec, as well as AH-only or ESP-with-AH IPSec traffic, the likelihood of successful IPSec operation is increased by using a public IP Source Address whenever it is available for IKE and all other IPSec traffic.

At step 210, client computer 106-A initiates an IKE negotiation. An IKE negotiation proceeds in a conventional manner, where a protocol stack starts with a private IP address and creates an IKE initiation packet. Notably, for an IKE negotiation, a private IP address may be used as an IP Source Address, because IKE is a "NAT-safe" protocol. Client 106-A may choose to use a public IP address as an IP Source Address when initiating an IKE negotiation, if such a public IP address is available.

Alternatively, a client computer 106-A may start with an IKE prior to obtaining a public IP address. However, if a gateway 106 were not configured to provide a public IP address (or were not capable of such action), then this would not be discovered until after an IKE negotiation completes, which may include an agreement to use AH-only or ESP-with-AH which would be incompatible with such a gateway 106. Accordingly, a new IKE would then need to take place.

Client computer 106-A may build packets having a public address as its IP Source Address that is either a gateway's own public address or an address chosen from a pool of public addresses that gateway 106 manages. Client computer 106-A may build packets having a private IP Source Address. In other words, client computer 106-A may be configured to select as between a private IP address and a public IP address, where this selection is premised on context of availability in one instance and, if available, whether an IPSec protocol is to be used in another instance. Once a public address is obtained, forming a packet with such a public address as a source address may be done in a conventional manner. In the latter context, where AH IPSec NAT is allowed, both IPSec-protected and non-IPSec-protected traffic may flow. Recall, non-IPSec protected traffic may use conventional NAT. Also, within a private domain, such as on a LAN, client 106-A may or may not engage in IPSec-protected communication with another local client. In such instances of intra-domain communication with IPSec, even though IPSec is being used, there is no need to use a public IP address because IP destination addressing is within the same private address domain as that of client computer 106-A. Thus, a user of client 106-A may determine whether or not to communicate with a peer station with IPSec or not, and determine if such a peer station is internal, i.e., has a local domain address, to client computer 106-A's private address domain or not for such communication.

In response to initiation of an IKE at step 210 by a client computer, gateway 106 may use receipt of an IKE initialization packet to record a MAC address for such a client computer and a destination IP address for such an IKE initialization packet at step 260. NAT gateway 106 may determine that a packet is an IKE packet by checking that the packet is a UDP packet with Source Port and Destination Port both equal to 500. A bit, namely a Pending bit, may be set at step 260 to indicate that outbound traffic for an IKE with this MAC address has been sent. This IKE packet's destination IP address is for a remote machine, such as a remote server as mentioned above. Gateway 106 does not directly participate in an IKE negotiation in any way, other that possible NAT translation of IKE packets, and then only if client 106-A uses a private IP address as such an IKE packet's Source Address. Note that a NAT gateway that supports IPSec must support IKE suppression, implying that only one IKE negotiation may be ongoing at any given time, so no port translation is required when network address translating IKE packets, as IP address translation alone is sufficient.

Referring to FIGS. 5A and 5B, there is shown an exemplary embodiment of an IPSec Allocation Mapping Table (IPSAMT) 300 at different times in accordance with one or more aspects of the present invention. IPSAMT 300 comprises a row for each IKE initiated and columns for respective fields for a Time Stamp 305, an ISAKMP Initiator Cookie 307, an IPSec Protocol identifier, a Local Client MAC Address 301, a Local Client Public IP Address 309, a Local Client Private IP Address 306, a Remote-to-Local Security Parameters Index 302, a Pending Bit 303, and a Remote IP Address 304.

Time Stamp field 305 is interpreted depending on status of Pending Bit field 303. If Pending Bit field 303 is set, Time Stamp field 305 is populated with the time of the most recent IKE packet between an address in Remote IP Address field 304 and an associated address in Local Client MAC Address field 301. If status of Pending Bit field 303 is clear, then Time Stamp field 305 comprises the time that the most recent IPSec-protected packet was received from a Remote IP Address matching an address in Remote IP Address field 304 in a row of mapping table 300. In the event that mapping table 300 is getting full, rows that have been idle the longest would be first in line for deletion using information from timestamp field 305.

IPSec Protocol field 308 may be encoded as a two-bit field, wherein a pattern of 00 indicates an invalid pattern, while 10 indicates AH, 01 indicates ESP, and 11 indicates ESP-with-AH; however, it should be understood that other encodings are possible. Remote-to-Local Security Parameters Index field 302 is for storing a Security Parameters Index value associated with traffic from an address in Remote IP Address field 304 directed at a particular local client, identified by its MAC Address and public or private IP address.

With continuing reference to FIGS. 5A and 5B, and renewed reference to FIGS. 1, 2 and 3, after NAT gateway 106 records a MAC address for client computer 106-A in a mapping table to match up to a first Remote IP Address recorded in that mapping table, "IKE suppression" may be used to ensure that only one IKE exchange is happening at a time between a local client machine and a Remote IP Address. Because only one IKE negotiation is outstanding at any given time between a local client and a Remote IP Address, there can only be one incomplete, missing Security Parameters Index entry for a row in such a mapping table at any given time. If multiple local machines are directed to access the same Remote IP Address using IPSec, IKE negotiations are processed on a first-come, first-served basis. Once a most prior IKE negotiation is complete, namely, once a new inbound Security Parameters Index is recorded from that Remote IP Address, then another IKE negotiation is allowed to begin. Specifically, gateway 106 receives a packet addressed to one of its public IP addresses from a Remote IP Address which has 1) Pending Bit 303 set in a row of such a mapping table, and 2) no Security Parameters Index entry in that row of such a mapping table. Gateway 106 records this packet's Security Parameters Index in this empty slot in this row of such a mapping table, such as IPSAMT 300, and forwards this packet to a client address taken from the same row of such a mapping table.

Notably, AH and ESP have respective Security Parameters Index types, and both inbound and outbound Security Parameters Index types exist. Thus, a mapping table may have a column for AH or ESP traffic, where AH includes ESP-with-AH. However, rows in a mapping table are added by watching for IKE exchanges between a local machine and a remote machine associated with a Remote IP Address.

A mapping table having a Remote IP Address of an IKE peer and a MAC address of a local client engaged in an IKE conversation with such an IKE peer is used to store a Security Parameters Index from such an IKE peer. Notably, after an IKE negotiation is complete, such a Security Parameters Index cannot be added to such a mapping table until after IPSec-protected traffic actually flows from a remote machine for such a Remote IP Address to NAT gateway 106. A Security Parameters Index is encrypted during an IKE, and only appears unencrypted or "in the clear" when real data for such an IPSec session is sent, namely, after an IKE session is successfully completed.

In addition to the above stated reasons regarding the association between Security Parameters Index from a remote address, because security parameters indices are encrypted during an IKE and only appear in the clear once real encrypted data begins to flow, only one open Remote-to-Local Security Parameters Index entry to a same destination IP address at a time may be allowed in a mapping table until actual data begins to flow as part of IKE suppression. Multiple IKE sessions may take place through gateway 106, as long as each active client is negotiating with a different Remote IP Address. Once a Security Parameters Index for a successfully negotiated IKE is obtained for a Remote IP Address, another IKE session may be initiated for that same Remote IP Address.

Accordingly, it should be understood that there are many modes of communication. If client 106-A used a public IP address as a source address when sending its IKE or IPSec-protected traffic, then return traffic is mapped using a mapping table to a Security Parameter Index, when available, to such a client's MAC address, and until such a Security Parameter Index is available, then return traffic is mapped using a mapping table to a Remote IP Address having an open Pending Bit to a client's MAC address.

If client 106-A used a private IP address when sending its ESP-only IPSec traffic, which traffic is subsequently network address translated, then for inbound traffic, NAT IP address translation is done by an association of a client's private IP address and a remote IP address (i.e., a source address for inbound traffic) as stored in a mapping table and port address translation is mapped using a mapping table to a Security Parameter Index, when available, to such a client's private IP address. If a Security Parameter Index is not available for such a remote IP address, then a client's private IP address having an open Pending bit associated with such a remote IP address is used.

Gateway 106 cannot determine in any explicit way whether or not an ISAKMP negotiation that was initiated by a local client 106-A was successfully completed. However, there are two implicit clues that can be used to help keep an unnecessary pending state from being maintained in a mapping table. If a local client initiates an ISAKMP Main Mode exchange, such a Main Mode exchange should be immediately followed by a Quick Mode exchange. If more than 5 seconds pass with no Quick Mode packets being seen, then this negotiation must have failed, and a row created in response to such an ISAKMP Main Mode exchange can be removed from such a mapping table. Alternatively, it is possible that a local client initiated an Aggressive Mode exchange, which always takes 3 packets. If two packets are seen, and then 5 seconds go by without seeing the third packet, such a negotiation must have failed, and a row created in response to such an ISAKMP Aggessive Mode exchange can be removed from such a mapping table. Accordingly, associating a time stamp with an ISAKMP initiator cookie in a mapping table may be used to determine whether such a time limit has lapsed.

Accordingly, it should be appreciated that no special or modified VPN is needed to support multiple VPN connections at the same time, because a Security Parameters Index, and not a port number, is used for back translation. Thus, no TCP or UDP header need be accessible for back translation as described herein. Moreover, because a Security Parameters Index is a fixed offset, access to it in a packet for use as an indice to a mapping table is facilitated. Alternatively, rather than modifying a NIC of a local client by way of a program product driver configured to do a second DHCP request to obtain a public IP address, if ESP-only VPNs are used, then gateway 106 is configured with a mapping table, but client 106-A does not need modification as IKE and ESP-only IPSec are NAT-compatible.

IKE suppression is not used for clients communicating with any number of distinct Remote IP Addresses using ESP-only IPSec. IKE suppression is used to support multiple local machines communicating with the same Remote IP Address. However, an ability to have many-to-one mapping for local to remote machines for VPN sessions without modification to a VPN is a substantial advantage. An example of this is telecommuters for a company all wanting to communicate to a same server of such a company.

By incorporating obtaining a public IP address at a network interface level, no operating system (OS) involvement is needed. In other words, at an OS level an IKE is initiated, in response to such an initiation a NIC 100 automatically requests a public IP address. This request does not require OS action other than IKE initiation. Moreover, NIC 100 is configured for IPSec, so a public address if obtained may automatically be used for IPSec packets. Additionally, known protocols supported by clients and gateways may be used without introducing any additional signal channel.

Figure 3A:
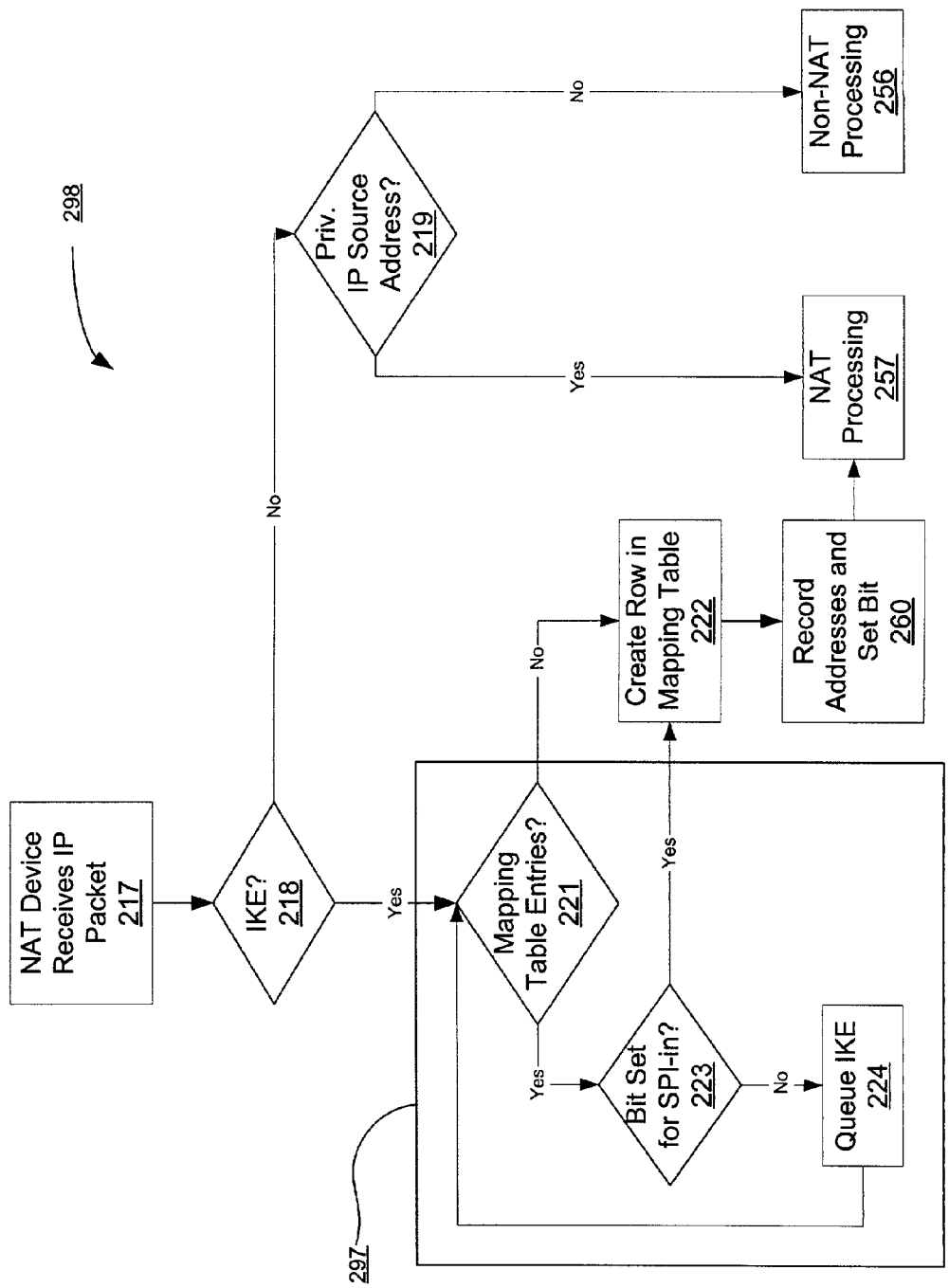

Referring to FIG. 3A, there is shown a flow diagram of an exemplary embodiment of IPSec/NAT gateway-side integration sub-process 298 with IKE suppression in accordance with one or more aspects of the present invention. At step 217, NAT gateway 106 receives a packet. This packet may be an IKE initiation packet from step 210 of FIG. 3. At step 218, NAT gateway 106 checks such a packet to determine if it is an IKE packet.

With continuing reference to FIG. 3A and renewed reference to FIGS. 1, 2, 5A and 5B, If at step 218 a received packet is not an IKE packet, then a check is made at step 219 to determine if such a packet has a public or a private IP address as a source IP address. It should be understood that NAT gateway 106 may receive IPSec and non-IPSec packets, but client computers, such as client computer 106-A through -C on LAN 102, send a public IP address as an IP Source Address to NAT gateway 106 only for communications relating to an IPSec session. Notably, it does not matter is ESP-only IPSec is negotiated, as a public IP address may be used as an IP Source Address for ESP-only traffic through NAT gateway 106. If at step 219 a source IP address is a public IP address available to NAT gateway 106, then this indicates to NAT gateway 106 to process such a received packet for an IPSec session. Thus, if a packet with a public IP Source Address is found at step 219, it is processed without NAT at step 256. In other words, NAT gateway 106 transmits such a packet with such a public IP address as a source IP address without any NAT on this packet. If a packet with a private IP Source Address is found at step 219, it is processed with NAT at step 257. In other words, NAT gateway 106 substitutes a public IP address for such a private IP Source Address prior to transmitting this packet onto WAN 104.

If at step 218 a received packet is an IKE packet, then at step 221 a check is made to determine if a destination IP address for such a packet is in a mapping table as part of an IKE suppression subroutine 297. By IKE control or suppression, it should be understood that an IKE-suppressed packet would not be transmitted by gateway 106 until a Remote-to-Local SPI is recorded, and Pending Bit is flipped, as described below in more detail. In other words, only one IKE "conversation" may be ongoing between any given local client MAC address and any given Remote IP Address.

By assumption, IKE traffic is always initiated by a local client, such as client 106-A, as NAT forces all external traffic to be initiated by local clients. This makes intuitive sense, as a public address must be substituted for a private address, and thus traffic can only initially flow in one direction through a NAT—from a local (private) side to a remote (public) side. Client 106-A's initial IKE "Main Mode" transactions, and its subsequent IKE "Quick Mode" transactions (or alternatively to Main plus Quick, the client may choose "Aggressive Mode" transactions) use the same client-selected 64-bit Initiator Cookie in an ISAKMP header. Subsequent re-keying is done at the discretion of local client 106-A, which can comprise of either further Quick Mode exchanges, or a new Main Mode exchange (which will require the client to select a new Initiator Cookie, causing a new row to be created in IPSAMT 300, the row being initially defined by the local client's IP or MAC address, the Remote IP Address, and the client's Initiator Cookie).

If at step 221 no such destination IP address appears in IPSAMT 300, then at step 222 a row is created in IPSAMT 300, and at step 260 a MAC address for client computer 106-A and a destination IP address for a remote computer system 101 are stored in association, and a Pending Bit for such a row is set, set to one (1) for example, in such a mapping table indicating that a Remote-to-Local Security Parameters Index associated with the Remote IP Address (the original IP Destination Address found in the local client's IKE packet) has not yet been observed. NAT processing is then done at step 257, as IKE packets are compatible with NAT.

If at step 221 a destination IP address for a received packet already exists in IPSAMT 300, then a check of an ISAKMP "Initiator Cookie" is made for an indication that a security negotiation between a Local Client MAC Address or Private IP Address and a Remote IP Address is already under way. Conventionally, an ISAKMP Initiator Cookie is a 64-bit binary number, though future revisions of the ISAKMP standard may change the size of this field, chosen at random by a client machine, which uniquely identifies all subsequent ISAKMP conversations between such a client and its ISAKMP peer. This cookie is not a web cookie, which conventionally is a small text file that a web server stores on a client computer through a web browser. Use of this field allows multiple ISAKMP negotiations to be correlated. If at step 221 no such Initiator Cookie appears in such a mapping table, then at step 222 a row is created in IPSAMT 300.

If at step 221 an ISAKMP Initiator Cookie in a mapping table matches a receive ISAKMP cookie, then at step 223 a check is made to determine if a Pending Bit is set for an associated row of such a mapping table, namely, associated by client's MAC address, Remote IP Address, and Initiator Cookie matching that of this received IKE packet being processed. Notably, a Pending Bit is optional, as a check for a Security Parameters Index may be made instead.

In the case of a new IKE conversation between local client 106-A and a Remote IP Address, Security Parameters Index field 302 will be have an open or empty entry for this row, since no IPSec-protected traffic resulting from this IKE exchange has been as yet observed by gateway 106. Notably, on a subsequent or new IKE conversation, re-keying could allow a new IKE conversation to negotiate a new Security Parameters Index that will take over when the old Security Parameters Index expires. If a Pending Bit in Pending Bit field 303 is set and a Security Parameters Index value is present in a Remote-to-Local-SPI field 302, then that Security Parameters Index value could be expiring soon, and gateway 106 may therefore anticipate such a Security Parameters Index in IPSec-protected traffic to be changing to a new value. This Pending Bit will be cleared when such a new Security Parameters Index is detected on Remote-to-Local IPSec-protected packets.

If at step 223 a Pending Bit in Pending Bit field 303 has been set, set to one (1) for example, to indicate that a Remote-to-Local Security Parameters Index from a machine for which such a destination IP address has been obtained and recorded in IPSAMT 300. If such a bit has been set—indicating that a Remote-to-Local Security Parameters Index has been obtained for a machine associated with that destination IP address—then a row is created in such a mapping table at step 222. This means that another IKE is not suppressed to the same Remote IP Address, as a Remote-to-Local Security Parameters Index for a prior IKE (from a different local client) has been obtained.

If, however, at step 223 a Remote-to-Local Security Parameters Index Pending Bit in a Pending Bit field 303 is not been flipped from its initial set value, i.e., is still zero (0), then this indicates that no other local client may use IKE to negotiate with the same Remote IP Address since no Remote-to-Local Security Parameters Index for IPSec-protected data from the indicated Remote IP Address has been observed in use. Accordingly, at step 224 such an IKE packet, or more particularly IKE initiation packet, may optionally be queued, and released for creation of a row in a mapping table at step 222 when a Remote-to-Local Security Parameters Index Pending Bit 303 is set for a prior IPSec session by repeated checking at step 223. Another option, rather than queuing the ISAKMP packet, would be to send the local client an ICMP Destination Unreachable (Type=3), with a sub-code=3 (Port Unreachable), or an ICMP Destination Unreachable (Type=3), with a sub-code=9 (Communication with Destination Host is Administratively Prohibited).

Figure 4:
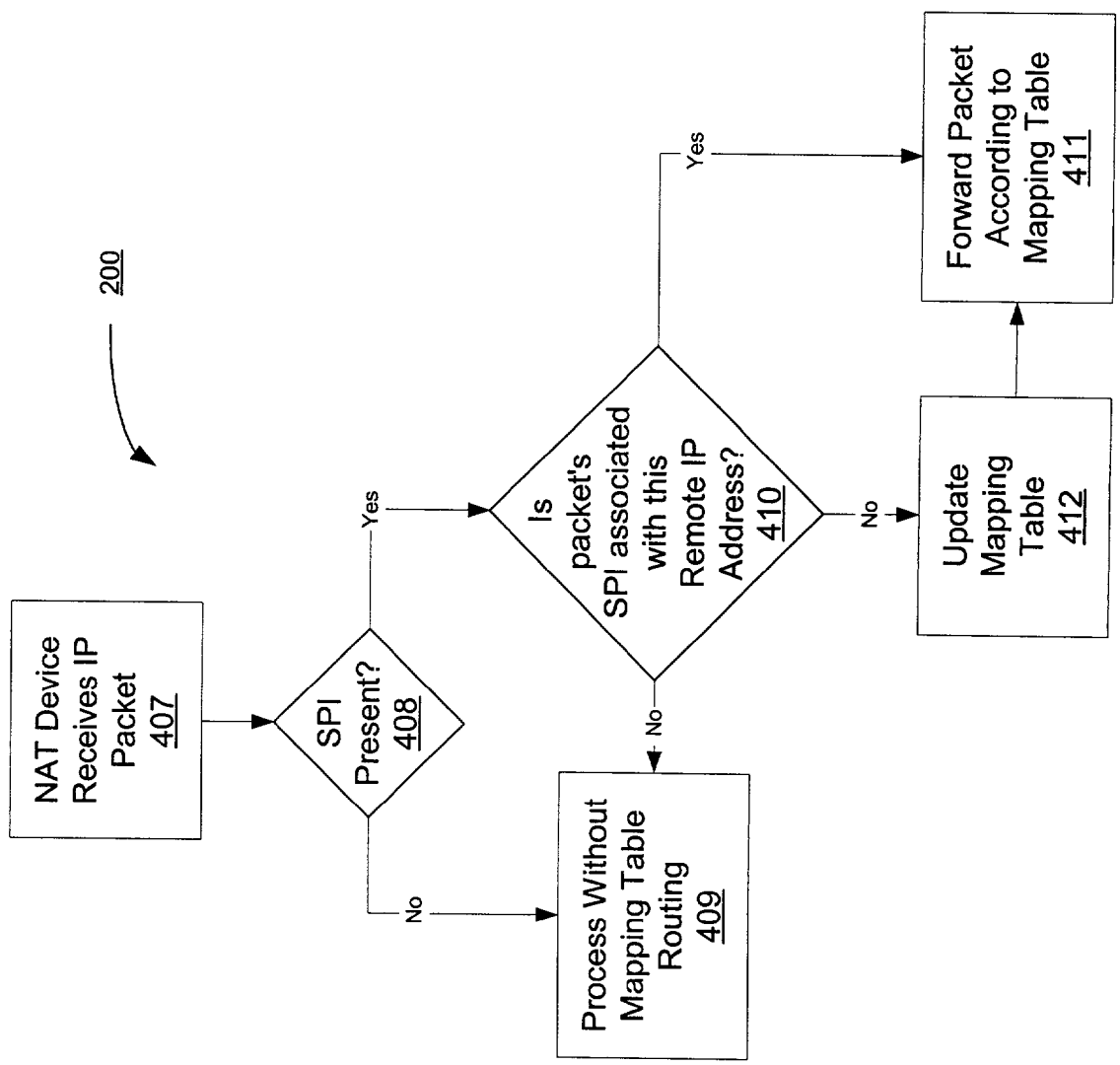

Referring to FIG. 4, there is shown a flow diagram of an exemplary embodiment of a receive-side for IPSec/NAT integration process 200 in accordance with one or more aspects of the present invention. With continuing reference to FIG. 4, and additional reference to FIGS. 1 and 2, receive-side of integration process 200 is described. At step

407, an IP packet is received by NAT gateway 106 from a computer system 101. At step 408, a comparison is made to determine if a Security Parameters Index is present in such a received packet. In other words, an IPSec-protected packet employing one of AH-only, ESP-only, and ESP-with-AH.

If an IKE negotiation has been initiated by a local client to some Remote IP Address, a Pending Bit in a Pending Bit field 303 is set, as no Remote-to-Local Security Parameters associated with traffic from the remote computer system 101 to local client 106-A that initiated such an IKE negotiation has been observed and recorded. If an IP Source Address of local client 106-A's IKE packet is a private address, then that client's private IP address will be stored in Local Client IP Address 306 field. When this field is occupied, gateway 106 knows that for IPSec traffic only ESP-only traffic should be allowed between client 106-A and a remote machine associated with this Remote IP Address. However, if local client 106-A uses a public IP address as the IP Source Address in its IKE packet(s), then gateway 106 must remember this client's MAC address by storing it in Local Client MAC Address field 301. When a field for this IKE Local Client MAC Address is occupied, client 106-A is may use AH-only, ESP-only, or ESP-with-AH forms of IPSec. Notably, in such case, client 106-A will be using a public IP address that was assigned by gateway 106, which may be recalled as stored at step 254 that a machine with this MAC address was assigned a public IP address. Only MAC addresses that were recorded in step 254 should be allowed to use their associated public IP addresses.

If IKE suppression is used, and if no IPSec-protected data flows from a machine with a Remote IP Address associated to a local client in a mapping table after an IKE negotiation, a Pending Bit in a Pending Bit field 303 will stay set, for example to one (1), precluding other clients from beginning IKE negotiation with the same destination IP address. Accordingly, a Time Stamp 305 may be used such that if a Remote-to-Local Security Parameters Index in a Remote-to-Local Security Parameter Index field 302 is not obtained within a determined time, thereby clearing such a Pending Bit, for example to zero (0), an expired row will be removed from IPSAMT 300 to allow another IKE to the same Remote IP Address to take place. This row need not be removed until another station actually tries to initiate an IKE negotiation with the same Remote IP Address, at which point such a conflict is noticed. Accordingly, such a Pending Bit in Pending Bit field 303 is verified to be set to one (1), and an associated Time Stamp in a Time Stamp field 305 is checked to verify that this row, or these row entries, is, or are, old enough to be purged.

If Pending Bit 303 is clear, i.e., set to zero (0), an associated row will stay in IPSAMT 300 until another IKE session between the same two addresses, namely, either a Local MAC or a Local Client Private IP address and a Remote IP Address, is initiated. If another IKE session is initiated between to machines already having an IKE session where a Remote-to-Local Security Parameters Index was obtained, the associated row for a prior IKE session between these two machines has a bit in Pending Bit field 303 set, even though a Remote-to-Local Security Parameters Index is known. Setting such a Pending Bit, to one (1) for example, in this instance indicates that the associated row is pending deletion. In situations where a new IKE will replace an existing IKE where a Remote-to-Local Security Parameters Index was obtained, it may be expected that a new Remote-to-Local Security Parameters Index will begin to be used for traffic from a Remote IP Address to a local client, at which point a new row can be cloned from an old row, different only in the value of a Remote-to-Local Security Parameters Index. Once such a new row has been created, a Pending Bit in Pending Bit field 303 in the old row can be cleared again, i.e., set to zero (0). More generally, each time a packet is seen to match a table entry, Time Stamp 305 field is updated, but an old row should soon cease to have any traffic arriving using an old Remote-to-Local Security Parameters Index, which will cause the row to get older and older as time passes. That row, once it is old enough, will be eliminated through normal "garbage collection" activities. A new IKE may be initiated for example because exchanged keys are about to or have expired.

A new IKE negotiation may happen at any time at the discretion of a local client initiating such a new IKE communication. IKE negotiations are not initiated by a remote machine or a Remote IP Address, even for established IKE sessions. A session originator, which in the case of NAT must always be a local client, initiates all further IKE conversations, for instance re-keying negotiations.

With continuing reference to FIGS. 5A and 5B and renewed reference to FIG. 4, if at step 408 no Security Parameters Index is in a received packet, such as in packets that are not protected by IPSec, then such a packet is routed at step 409 without consulting IPSAMT 300. Such a routing decision may be driven by a gateway NAT table that drives gateway 106's non-IPSec NAT functions. As NAT is well known, a detailed discussion of NAT is omitted for purposes of clarity.

If at step 408 a Security Parameters Index is found in a packet received at step 407, then at step 410 a check of IPSAMT 300 is made to determine if a Remote-to-Local Security Parameters Index exists for the IP Source Address of such a packet matching an address in Remote IP Address field 304. If at step 410 there is a value in Remote-to-Local Security Parameters Index field 302 from ISAMT 300, then at step 411 such a matching packet is routed to an associated address in Local Client MAC Address field 301 or in Local Client Private IP Address field 306 associated with such a value in Remote-to-Local Security Parameters Index field 302 from IPSAMT 300 as found in such a received packet.

When gateway 106 identifies a client computer using a MAC address in a mapping table, this local client has used a gateway-supplied public IP address as an IP Source Address in its local-to-remote packets. Gateway 106 in such instances stores for recall or remembers such a local clients address from Local Client Public IP Address field 309 so that gateway 106 can ensure that only the MAC address in this domain which originally used DHCP to obtain such a public IP address (by inverting its local bit) should be able to use this public IP address. Because the IP Source Address of such local-to-remote packets is already a public IP address, the gateway need not perform any NAT translation of the packet. Therefore AH-protected packets can escape the local domain without encountering IP address translation, so the remote side will be able to verify the digital signature embedded in the AH header. The local client address, whether private IP address or (public IP address, MAC address) pair, is recorded from the initial traffic from the local client to the Remote IP Address, so that the gateway 106 will be able to determine to which local client it should forward the return traffic. The local client's MAC address is extracted from the MAC Source Address field of the first local-to-remote packet that was destined for the Remote IP Address.

For situations in which there are more active clients than gateway-managed public IP addresses, there will be a many-to-one mapping of Remote IP Addresses to local clients, in which the Remote-to-Local Security Parameters Index is used to identify which of the rows in the table corresponds to the proper local client. Gateway 106 stores for recall which form of destination address should be used for final delivery to a local station. For local client machines whose MAC address and public IP address were recorded, the IP Destination Address in return traffic will also be the same public IP address that gateway 106 respectively assigned to such local client machines. So gateway 106 knows it can safely send that packet, addressed to the client's public IP address, unmodified (except that the MAC frame's MAC Source Address will be that of the gateway's LAN interface on the local subnetwork, and the frame's MAC Destination Address will be the Local Client MAC Address that the gateway 106 had recorded in the matching row of the table).

For traffic to local clients for whom their private IP address was recorded (only ESP-only traffic could be in this category), gateway 106 uses an address in Remote IP Address field 304 and a value in Remote-to-Local Security Parameters Index field 302 to identify the proper row in a mapping table, from which an address in Local Client Private IP Address field 306 is extracted thereby translating a packet's IP Destination Address to such a local client's private IP address.

If at step 410 there is no value in a Remote-to-Local Security Parameters Index field 302 associated with any row of a mapping table whose address in Remote IP Address field 304 matches a received packet's IP Source Address and for which a bit in Pending Bit field 303 of that row in such a mapping table is set, for example to one (1), then at step 412 IPSAMT 300 is updated by addition of a value added to Remote-to-Local Security Parameters Index field 302 from such a received packet having such an IP Source Address and having such a value pending. In response, a bit in Pending Bit field 303 is cleared (i.e., set to zero (0)) for this row, indicating receipt of the pending Remote-to-Local Security Parameters Index value. Each time a packet matches a row in the table, Time Stamp field 305 is updated for that row.

In FIG. 5B, examples of a Remote-to-Local Security Parameters Index field 302 value and Pending Bit field 303 value are written into Remote-to-Local Security Parameters Index column or field 302 and Pending Bit column or field 303, respectively, to update IPSec IPSAMT 300. Moreover, if IKE suppression is active, then clearing a bit in Pending Bit field 303 by flipping it, for example to zero (0), allows another local client to initiate an IKE session to the same Remote IP Address that had previously been in a pending receipt of a Security Parameter Index value state. After updating at step 412, at step 411 such a received IP packet is routed by NAT gateway 106 according to an address from Local Client MAC Address field 301 or from Local Client Private IP Address field 306 in IPSAMT 300 to a client computer 106-A associated therewith.

Notably, if there is no row with a matching Remote-to-Local Security Parameters Index 302 for a received packet, NAT gateway 106 may still correctly route such a received packet provided only one Local Client MAC Address is in communication with such a Remote IP Address. Alternatively, if more than one open Remote-to-Local Security Parameters Index for the same Remote IP Address were allowed, then such a packet may be sent to each Local Client MAC Address in communication with such an Remote IP Address, or sent to the broadcast MAC address for all client computers on LAN 102, and NAT gateway 106 could then wait for a bi-directional response to be able to link the proper local client with the proper Remote-to-Local Security Parameters Index for that Remote IP Address.

It is possible that two different local clients could choose the same Remote-to-Local Security Parameters Index value when engaged in IKE negotiations with the same Remote IP Address. This is possible even if IKE suppression is used in cases where all the clients are sharing the same public IP address. However, in cases where the two clients that have chosen the same Remote-to-Local Security Parameters Index value and have been assigned different Local Client Public IP Addresses, the packet can be forwarded based on a 4-tuple association with a received packet, namely, Remote IP Address, Remote-to-Local Security Parameters Index, IPSec Protocol, and Local Client Public IP Address.

For cases in which the local clients have the same public IP address, whichever MAC address that gets into IPSAMT 300 first will receive all associated traffic for that Remote-to-Local Security Parameters Index 302, as there is no way for gateway 106 to delineate traffic for one station apart from that of another station with a same 4-tuple association. However, communications between the second local client and this Remote IP Address will not succeed, and thus these communicating parties will attempt a new IKE negotiation, which in all likelihood will result in the choice of a unique Remote-to-Local Security Parameters Index value, as Remote-to-Local Security Parameters Indices are a randomly chosen numbers from the range of 256 to 4,294,967,295, inclusive, where 0 to 255 have been reserved.

One way to prevent the choice of overlapping Remote-to-Local Security Parameters Indices would be to have end-stations broadcast their current IP addresses and security parameters indices onto a LAN, so other stations in the domain can check for duplication. However, such a scheme would require significant changes to client software, and accordingly is substantially complex compared to letting a communication session fail, a low probability event, and having end-stations with a disabled IKE session recover by initiating another IKE session.

Notably, after a successful IKE negotiation, IPSec packets encrypt an upper-layer of protocol information, and thus this information is not available to a NAT gateway 106. However, a Security Parameters Index is available to a gateway, as it is not encrypted for an IPSec session. Moreover, a Security Parameters Index is available in each header type, namely, an ESP header and an AH, including, but not limited to, ESP-with-AH. Accordingly, once IKE is completed by a client computer and a destination computer and encrypted data is exchanged using keys, NAT gateway comprises an updated IPSAMT 300 with an Remote-to-Local Security Parameters Index value that may be used for communication with either or both types of IPSec, namely, ESP and AH.

Notably, though an IPSAMT structure has been described herein as a single entity, it should be apparent that such IPSAMTs might be broken up into multiple tables, wherein one or more columns may be duplicated. This may be advantageous for having one or more tables created in hardware, firmware, software, or any combination thereof. Accordingly, by mapping table, it is meant to include a single mapping table as well as a plurality of mapping tables having associations. Moreover, information collected and associated as described herein may be stored in forms other than tabular, including, but not limited to, a database and like data structures.

New Security Parameters Indices in an AH or ESP packet may also be identified by use of a Sequence Number field in such a packet. The first packet on a new Security Association (SA) will always have a Sequence Number of "0x00-00-

00-01". Although the header formats differ, AH and ESP each use the Sequence Number field in the same way, in that it starts from "0x00-00-00-01" in both cases and is incremented by 1 for every packet that is sent, and that it cannot exceed 0xFF-FF-FF-FF. The first Remote-to-Local Security Parameters Index should arrive with a Sequence Number of "0x00-00-00-01", and any time the two stations engage in re-keying, the new Remote-to-Local Security Parameters Index must arrive with the Sequence Number field set to "0x00-00-00-01". A packet that contains a new Security Parameters Index value but whose Sequence Number is greater than "0x00-00-00-01" is an invalid packet, which the gateway may choose to discard. There is likely to be little harm in forwarding such packets, however, since the client is equally capable of detecting such an error condition.

Another error situation that the gateway could choose to enforce would be to block packets whose Remote-to-Local Security Parameters Index wraps from 0xFF-FF-FF-FF to 0x00-00-00-00. In order for the gateway to enforce this restriction, the gateway would have to either track the Sequence Number for each row in the mapping table, or trigger on the Sequence Number value of 0xFF-FF-FF-FF by deleting the matching row from the mapping table, so that future traffic would not be able to be forwarded. Again, the local client should also be able to enforce this restriction, so it is not required that the gateway shield the client from this situation, although such shielding would not, if enabled, interfere with the algorithms described in this document.

Moreover, SA renegotiation may be predetermined or predicted by the gateway, because as stated above, the Sequence Number field is not permitted to wrap from 0xFF-FF-FF-FF to 0x00-00-00-00. Once a Sequence Number value gets within 33% or less of 0xFF-FF-FF-FF, the gateway may reasonably expect to see a new IKE exchange to set up a new SA. Of course, the two parties could choose to negotiate a new SA sooner than the Sequence Number space can wrap —an SA's negotiated lifetime will probably be much shorter than the time it would take for a peer to transmit 4,294,967,295 packets. However, in the event that an SA was negotiated with a very long lifetime, during which the packet transmission rate was very high, the Sequence Number might provide a cue that a new IKE exchange is imminent.

There may be multiple SAs in existence between a local client and remote machine. There could be AH-alone, ESP-alone, or ESP-with-AH, where each has a unique Security Parameters Index. Accordingly, mapping table 300 comprises an "IPSec Protocol" value column 308, indicating whether a Remote-to-Local Security Parameters Index value is associated with AH, ESP, or both. Moreover, mapping table 300 may record both AH and ESP security parameters indices independently, for example in separate rows in table 300, because there is a chance that Remote-to-Local Security Parameters Index values could be the same for AH and ESP, so recording AH or ESP protocol type is needed to tell which is which. Notably, if two local clients were talking to the same Remote IP Address and both select the same Remote-to-Local Security Parameters Index for the same IPSec protocol, gateway 106 would forward all the traffic for both Security Associations to the client that first negotiated that Remote-to-Local Security Parameters Index.

It is possible that an SA could be idle for a long time after an IKE initial exchange, or after a re-keying exchange, and even though each side has agreed upon a new Security Parameters Index, they may not have communicated IPSec-protected data, so no IPSec-protected data will have arrived at gateway 106 to allow the Remote-to-Local Security Parameters Index field 302 in mapping table 300 to be populated. It is possible that during this quiet time a third party could send in a fake spoofed packet on a randomly-chosen (invalid) Security Parameters Index, with a sequence number of 0x00-00-00-01. Gateway 106 can immediately reject such packets if it knows that no IKE has taken place between internal and external machines (i.e., if there are no rows in mapping table 300 that have Pending Bit field 303 set to one (1) and do not have a Security Parameters Index value in the Remote-to-Local Security Parameters Index field 306) of a row matching the purported IP Source Address in the inbound packet. However, if there has been an IKE exchange but no IPSec traffic has been flowed through gateway 106 yet, only endpoints of an IKE connection can know for sure if a Security Parameters Index is valid. Gateway 106 should therefore watch for a complete bi-directional IPSec-protected traffic exchange between the IKE peers before recording a new Remote-to-Local Security Parameters Index in field 302.

If a fake packet were sent in, as described above, local client 106-A would either discard such a fake packet or would send an error message, or would start a new IKE exchange, such as to verify an existing SA or to negotiate a new one. If client 106-A responds with an IPSec-protected packet, but the Remote IP Address uses a different Security Parameters Index in its response, then gateway 106 knows that the first Security Parameters Index it saw was a fake Remote-to-Local Security Parameters Index.

Gateway 106 cannot clear a Pending Bit 303 until it has seen a bi-directional IPSec-protected exchange between an external machine and an internal machine. Gateway 106 can use an initial Sequence Number as additional proof that it has a correct Remote-to-Local Security Parameters Index value. For spoofed packets received for which such spoofed packet's Security Parameters Index is not in mapping table 300, gateway 106 may discard any IPSec-protected packets purporting to be from a Remote IP Address that do not have a known Security Parameters Index—provided gateway 106 knows that no IKE exchange has occurred that may have legitimately invalidated an existing Security Parameters Index in mapping table 300. Gateway 106 can discard such packets regardless of the value in the Sequence Number field. In short, if a non-matching Security Parameters Index arrives from a Remote IP Address and no rows matching that IP address have the Pending Bit 303 set, the packet may be deleted.

Some embodiments of the present invention are program products that may reside in whole or in part in memory of a gateway and/or a client computer. Memory may comprise volatile and/or non-volatile memory, including but not limited to magnetically readable memory (e.g., floppy disk, hard disk, and the like), optically readable memory (e.g., CD-ROM, -RW, DVD-ROM, -RAM, and the like), and electrically readable memory (e.g., DRAM, SRAM, EEPROM, registers, latches, and the like). Accordingly, some embodiments of the invention are program products containing machine-readable programs. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

While foregoing is directed to the preferred embodiment of the present invention, other and further embodiments of the invention may be devised without departing from the basic scope thereof, and the scope thereof is determined by the claims that follow. Claims listing steps do not imply any order of the steps unless such order is expressly indicated.

All trademarks are the respective property of their owners.

The invention claimed is:

1. A method for network address translation for source address protected packets in a system comprising a plurality of client computers and an address server computer comprising a NAT gateway computer in communication with the client computer the method comprising:
   one of the client computers requesting a first address from the address server computer, the client computer identifiable to the address server computer by a medium access control number comprising a Medium Access Control address;
   providing by the address server computer to the client computer a private address in response to the first request;
   generating an alteration of the medium access control number by the client computer to provide an altered medium access control number wherein a local bit of the Medium Access Control address is flipped;
   then requesting by the one client computer a second address from the address server, the client computer identifiable by the address server computer by the altered medium access control number;
   associating by the address server computer the client computer with the first request and the second request by relating the medium access control number with the altered medium access control number;
   in response to the first and second requests providing by the address server computer to the client computer a public address in response to the second requests, both the first and the second address requests being initiated by the client computer negotiating IPSec Security Association with a remote computer;
   negotiating a Security Parameter Index (SPI) with a remote station;
   the NAT gateway computer accessing the SPI from an IPSec-protected packet received from the remote computer; and
   the NAT gateway computer then negotiating other Security Associations with the remote stations on behalf of other local computers behind the gateway computer.

2. The method of claim 1 wherein the public address is an Internet Protocol (IP) public address of the NAT gateway computer.

3. The method of claim 1 wherein the public address is an Internet Protocol (IP) public address from a pool of public IP addresses managed by the NAT gateway.

4. A method for probing a gateway computer by a local client computer to determine if network address translation is integrated with source address security, comprising:
   requesting a first address from the gateway computer with a first client identifier;
   receiving the first address from the gateway computer in response to the first request.
   after receiving the first address, requesting a second address from the gateway computer with a second client identifier, the second client identifier similar to the first client identifier;
   receiving the second address from the gateway computer in response to the second request in response to the first and second requests;
   determining from the second address requested whether the network address translation is integrated with the source address security for the gateway computer the first and the second address requests being initiated by the client computer negotiating IPSec Security Association with a remote computer, wherein the first client identifier is the Medium Access Control address of the local client computer and the second client identifier is the Medium Access Control address of the local client computer with a local bit flipped;
   negotiating a Security Parameter Index (SPI) with a remote station;
   the NAT gateway computer accessing the SPI from an IPSec-protected packet received from the remote computer; and
   the NAT gateway computer then negotiating other Security Associations with the remote stations on behalf of other local computers behind the gateway computer.

5. The method of claim 4 wherein the second address is a global Internet Protocol address of the gateway computer indicating that the network address translation is integrated with the source address security.

6. The method of claim 4 wherein the second address is from a pool of public addresses available to the gateway computer indicating that the network address translation is integrated with the source address security.

7. The method of claim 4 wherein the second address is a local domain address indicating that the network address translation is not integrated with the source address security.

8. The method of claim 4 wherein each of the Security Association negotiations is used by the gateway computer as a trigger to record an association between one of the local computers local address with the remote computers IP destination address, where the local address and the destination address are obtained from a negotiated outbound security negotiation packet including the negotiated SPI.

9. The method of claim 8 wherein the SPI is stored in association with an address of the local computer.

10. The method of claim 9 wherein the local address is a MAC address where NAT includes an authentication header (AH), and is a focal computer's private IP address where NAT includes encapsulated security pay load 1(ESP).

11. The method of claim 10 wherein the gateway computer includes a data structure including for each of the local computers the local address, the remote address, and the SPI from the remote machine and the MAC of the local computer.

12. A computer readable medium containing a program which, when executed by a client computer connected to a local area network which is connected to a gateway computer, the client computer executing a method for connecting through the gateway computer to a remote station including:
   requesting an address from the gateway computer with a client identifier comprising a Medium Access Control;
   altering the client identifier to provide another client identifier similar to the client by inverting a local bit of the Medium Access Control address;
   requesting another address from the gateway computer with the other client identifier in response to the first and second requests;

determining from a response of the gateway computer to the requesting with the other client identifier whether the gateway computer is integrated with the source address security, the first and the second address requests being initiated by the client computer negotiating IPSec Security Association with a remote computer;

negotiating a Security Parameter Index (SPI) with a remote station;

the NAT gateway computer accessing the SPI from an IPSec-protected packet received from the remote computer; and the NAT gateway computer then negotiating other Security Associations with the remote stations on behalf of other local computers behind the gateway computer.

13. The method of claim 12 wherein the response is a global Internet Protocol address of the gateway computer indicating that the network address translation is integrated with the source address security.

14. The method of claim 12 wherein the response is from a pool of public addresses available to the gateway computer indicating that the network address translation is integrated with the source address security.

15. The method of claim 12 wherein the response is a local domain address indicating that the network address translation is not integrated with the source address security.

* * * * *

UNITED STATES PATENT AND TRADEMARK OFFICE
CERTIFICATE OF CORRECTION

PATENT NO. : 7,191,331 B2 Page 1 of 1
APPLICATION NO. : 10/172345
DATED : March 13, 2007
INVENTOR(S) : Maufer et al.

It is certified that error appears in the above-identified patent and that said Letters Patent is hereby corrected as shown below:

In column 22, line 48, replace "focal" with --local--

Signed and Sealed this

Twenty-second Day of May, 2007

JON W. DUDAS
*Director of the United States Patent and Trademark Office*